(12) United States Patent
Bowen et al.

(10) Patent No.: US 6,836,470 B1
(45) Date of Patent: Dec. 28, 2004

(54) METHOD FOR RELIABLE MESSAGE DELIVERY IN A NETWORK OF MOBILE COMPUTERS

(75) Inventors: Nicholas Sewall Bowen, Newtown, CT (US); Marisa S. Viveros, Hartsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/240,143

(22) Filed: Jan. 29, 1999

(51) Int. Cl.$^7$ ................................................. H04Q 7/00

(52) U.S. Cl. ...................................... 370/329; 455/445

(58) Field of Search ................................ 370/328, 329, 370/349, 350, 395.2, 395.3, 410, 522, 227–229; 455/445

(56) References Cited

U.S. PATENT DOCUMENTS 5,774,461 A * 6/1998 Hyden et al. ............. 370/310.2
5,781,536 A * 7/1998 Ahmadi et al. ............. 370/252
5,983,090 A * 11/1999 Aoki .......................... 455/403

* cited by examiner

Primary Examiner—Wellington Chin
Assistant Examiner—Brenda Pham
(74) Attorney, Agent, or Firm—Thomas A. Beck; Daniel P. Morris

(57) ABSTRACT

We disclose a method for reliable message delivery between three parties in a network of mobile devices. This method consists of augmenting the services provided by a Network Service Provider (NSP) or a similar entity with a method combining store-and-forward of messages and a token which is stored in the mobile computer. This token represents an identifier of the last point-of-presence used for connecting to the network and it is used for inquiring about previous requests. Thereby, guaranteeing delivery of requests in spite of lack of resources availability.

5 Claims, 2 Drawing Sheets

METHOD FOR RELIABLE MESSAGE DELIVERY IN A NETWORK OF MOBILE COMPUTERS

FIELD OF THE INVENTION

The field of invention relates to reliable message delivery between three parties in a network of mobile services.

BACKGROUND

A network of mobile devices requires the interaction of a three party communication, that is, the mobile device, the service being used, and the Network Service Provider (NSP) or some other entity that enables a communication link between mobile devices and a provider of services. Within most applications for mobile computers, these devices have limited resources but can perform some operations in disconnected mode. The services accessed by the mobile device reside in some computer system called servers. The NSP is only a channel for using resources located in the network and it enables access to such resources by providing connectivity and authentication.

The problem solved by this invention arises when a server is unavailable to perform a request. If the resources in the server are available to process a request, the request is processed, and an acknowledgment is sent back to the mobile device indicating completion of the service. However, if the server resource being accessed is not available, the mobile device receives a message indicating that the request could not be completed. The mobile device must reconnect at a later point in time and it must issue the request again.

SUMMARY OF THE INVENTION

Herein we disclose a method for reliable message delivering between three parties in a network of mobile devices. This method consists of augmenting the services provided by an NSP with the known method of store-and-forward and a token which is stored in the mobile computer. This token represents an identifier of the last point-of-presence used for connecting to the network and it is used for inquiring about previous requests. Thereby, guaranteeing delivery of requests in spite of lack of resources availability.

Using this method, when a mobile computer connects to the network through an NSP at a specific point-of-presence and it makes a request for a resource; if the resource is available the request is serviced, and the mobile device receives an acknowledgment indicating completion of the task. However, if the resource is not available, a system (or algorithm) at the point-of-presence performs the following functions:

- logs the request in persistent storage on behalf of the mobile computer,
- sends a token containing the address of the point-of-presence. This token is stored in the mobile computer.

After that, the mobile computer may disconnect from the network. Once the resource becomes available, a system at the point-of-presence sends one or multiple requests to the server and receives acknowledgment of completion. The system at the point-of-presence stores the acknowledgment for later inquire.

When the mobile computer connects again to the network through the same NSP at the same or a different point-of-presence, the mobile device sends the last token stored in its local storage, the system at the point-of-presence inquires for pending requests at the location the token indicates. If the requests are completed, acknowledgment is sent to the mobile computer. If the requests are not yet completed, the requests migrate to the new point-of-presence and a new token identifying the new point-of-presence is sent to and stored at the mobile computer. This process is invoked each time the mobile computer connects to the network, until all pending requests are completed.

This method guarantees minimum usage of resources at the mobile device because it only stores the last token. All the processing is performed in a system at the point-of-presence. This method also guarantees that requests are distributed in the network wherein no central point is a bottleneck. The requests migrate along the network with the mobile computer.

DETAILED DESCRIPTION

Figure 1:
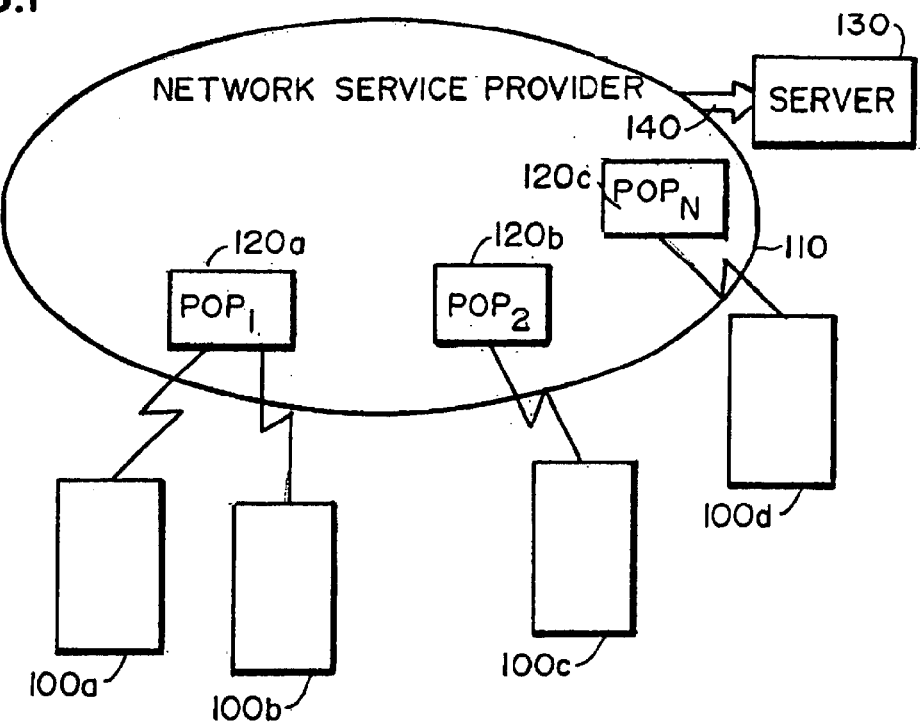
FIG. 1 is an schematic diagram of an environment where this invention applies.

As shown in FIG. 1, a typical environment where this invention applies includes the following components: 100a, 100b, 100c, and 100d represent mobile devices that have reduced computing resources and can perform operations disconnected from a network. These devices usually have a processor, non-volatile memory, data input mechanism, and the resources for communication. The mobile devices connect to 110, a communications network that permits the access to remote services. In this network, 120a, 120b, 120c, and 120d indicates points of presence, that is, the point closer to the device and enabling access to a requested service. The service will be hosted on 130, a server providing access to resources such as applications, data, storage, and not limited to other type of resources. The server is also connected to the network, 140.

Typically, the mobile device will connect to the network and this request will be forward to access the required resource. If the resource is available, the device will perform the request and obtain a response.

Figure 2:
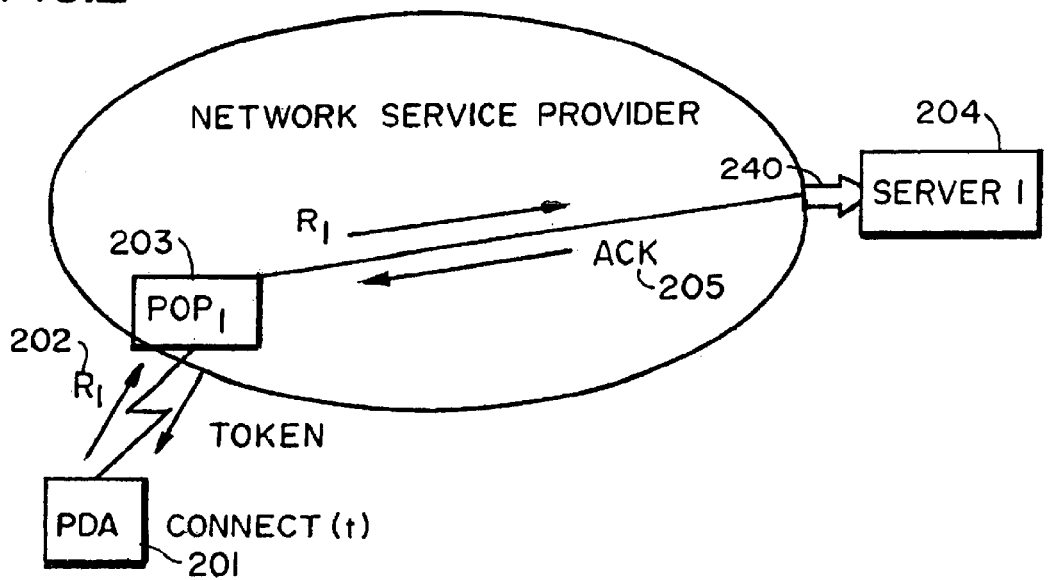
FIG. 2 is a diagram showing the interactions among a mobile device and the requesting resource using store-and-forward mechanism.

FIG. 2 describe the sequence of interactions that are carry-on when a mobile device connects to the network and uses this invention.

More specifically, FIG. 2 depicts the sequence of interactions between a mobile device and the service provider when the resource is unavailable.

In FIG. 2 in step 1, PDA (201) sends request $R_1$ (202) to $POP_1$ (Point of Presence) (203) where in step 2, a TOKEN (not shown) is generated. Thereupon, as a part of step 2, $POP_1$ returns the generated TOKEN to PDA (201). In step 3, $POP_1$ (203) then forwards request $R_1$ (202) to Server 1 (204) which is operational and functioning. In step 4, Server 1 (204) returns ACK (205) of $R_1$ (202) to $POP_1$ (203). In the fifth step, if PDA (201) is still connected, ACK (205) of $R_1$ (202) is returned to PDA (201).

Figure 3:
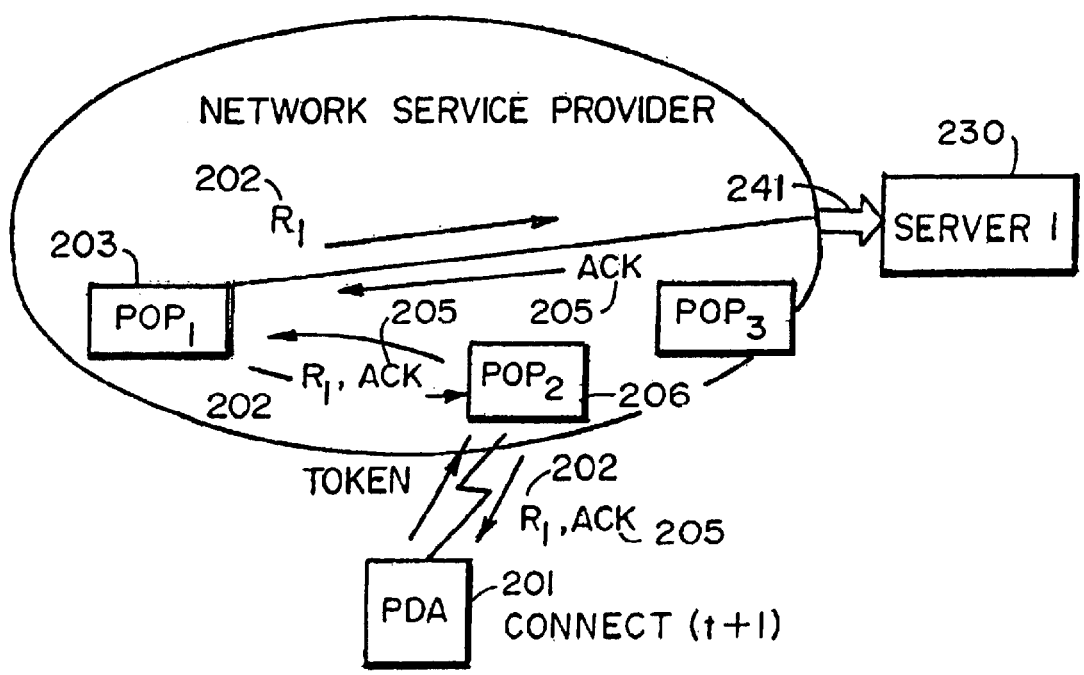
FIG. 3 is a diagram showing the interactions among a mobile device and the service provider when the resource is unavailable.

In the event that the fifth step as described above cannot complete because the client was no longer connected, a sequence of steps occurs as depicted in FIG. 3.

FIG. 3 depicts the interactions between a mobile device and the service provider when the resource is unavailable. In such event. POP₁ (203) logs ACK (205) of R₁ (202) and associates same with the TOKEN noted above. PDA (201) later connects to POP₂ (206). The sixth step provides that PDA (201) sends the TOKEN (as generated in step 2 of FIG. 1) to POP₂ (206) looking for the response to request R₁ (202). In the seventh step, POP₂ (206) is able to use the content of the TOKEN to determine the address of POP₁ (203). POP₂ (206) sends a message to POP₁ (203) requesting the status of the request associated with TOKEN. In the eighth step, POP₁ (203) uses additional information in the TOKEN to determine the location of ACK (205) of R₁ (202) on permanent storage and returns ACK (205) of R₁ (202) to POP₂ (206). Finally in the ninth step, POP₂ (206) returns ACK (205) of R₁ (202) to PDA (201).

POP₁ (203) can elect to retain the ACK (205) of R₁ (202) information on its log such that if step nine above does not complete, PDA (201) could reconnect another time to retrieve that status.

In FIGS. 2 and 3, the mobile devices connect to a communications network 210 that permits access to remote services. In the network, points of presence 203 and 206 represent points closer to the device and enabling access to a requested service. The service is hosted on 230, a server providing access to resources such as applications, data, storage, etc. The server is connected to the network at 240 and 241.

We claim:

1. A method for delivering a message among at least three parties on a network comprising:

augmenting the services provided by a Network Service Provider (NSP) using a store-and-forward method and a token which is stored in a mobile computer;

wherein said mobile computer connects to said network through said NSP at a specific point-of-presence, and said mobile computer makes a request for a resource; if said resource is available, the request is serviced, and the mobile computer receives an acknowledgment indicating completion of said request;

if said resource is not available, a system at the point-of-presence performs a function comprising:

logging in said request in persistent storage on behalf of said mobile computer; and sending a token containing the address of the point-of-presence said token is stored in said mobile computer;

said token represents an identifier of the last point-of-presence used for connecting to said network and said token is used for inquiring about previous requests, thereby guaranteeing delivery of requests in spite of lack of resources availability.

2. A method according to claim 1 wherein said system at said point-of-presence if said resource is not available is an algorithm.

3. A method according to claim 1 further including optionally disconnecting said mobile computer from said network, once said resource becomes available, whereupon a system at said point-of-presence sends one or more multiple requests to a server and receives acknowledgement of completion, said system at said point-of-presence stored said acknowledgement for later inquiry.

4. A method according to claim 3 further including a process wherein when said mobile computer reconnects to said network through the same or a different said point-of-presence, and said mobile computer sends the last token stored in its local storage, said system at said point-of-presence inquires for pending requests at the location the token indicates; if said requests are completed, acknowledgement is sent to said mobile computer, if said requests are not completed, said requests migrate to a new point-of-presence and a new token identifying a new point-of-presence is sent to and stored at said mobile computer.

5. A method according to claim 4 wherein said process is invoked each time the mobile computer connects to the network, until all pending requests are completed.

* * * * *